United States Patent
Van Dalen et al.

(10) Patent No.: US 9,384,681 B2
(45) Date of Patent: Jul. 5, 2016

(54) MODEL NEWBORN HUMAN EYE AND FACE MANIKIN

(71) Applicant: Eye Care and Cure Asia Pte Ltd, Singapore (SG)

(72) Inventors: Johan T. W. Van Dalen, Tucson, AZ (US); Dan D. Carda, Tucson, AZ (US)

( * ) Notice: Subject to any disclaimer, the term of this patent is extended or adjusted under 35 U.S.C. 154(b) by 212 days.

(21) Appl. No.: 14/295,243

(22) Filed: Jun. 3, 2014

(65) Prior Publication Data
US 2014/0356836 A1    Dec. 4, 2014

Related U.S. Application Data

(60) Provisional application No. 61/830,528, filed on Jun. 3, 2013.

(51) Int. Cl.
| G09B 23/28 | (2006.01) |
| G09B 23/30 | (2006.01) |
| G09B 23/34 | (2006.01) |

(52) U.S. Cl.
CPC .......... *G09B 23/303* (2013.01); *G09B 23/286* (2013.01); *G09B 23/34* (2013.01)

(58) Field of Classification Search
USPC ......... 434/262, 267, 270, 271, 272, 295, 296; 446/391, 392
See application file for complete search history.

(56) References Cited

U.S. PATENT DOCUMENTS

| 5,893,719 A * | 4/1999 | Radow | G09B 23/28 434/271 |
| 6,485,142 B1 * | 11/2002 | Sheehy | G09B 23/22 351/203 |
| 6,589,057 B1 * | 7/2003 | Keenan | G09B 23/30 434/271 |
| 6,923,654 B2 * | 8/2005 | Johnson | A61K 31/557 434/295 |
| 7,066,598 B2 * | 6/2006 | Niven | A61B 3/00 351/200 |
| 7,291,016 B2 * | 11/2007 | Otto | G09B 23/34 434/270 |
| 7,896,653 B2 * | 3/2011 | Nylen | G09B 23/32 434/271 |
| 8,128,412 B2 * | 3/2012 | Carda | G09B 23/30 434/271 |
| 8,157,568 B2 * | 4/2012 | Hara | G09B 23/34 434/262 |
| 8,308,487 B2 * | 11/2012 | Van Dalen | G09B 23/286 434/271 |
| 8,684,743 B2 * | 4/2014 | Van Dalen | G09B 23/30 434/267 |
| 8,821,166 B2 * | 9/2014 | Akura | G09B 23/28 424/427 |
| 8,845,334 B1 * | 9/2014 | Stoll | G09B 23/30 434/262 |

* cited by examiner

*Primary Examiner* — Kurt Fernstrom
(74) *Attorney, Agent, or Firm* — Dale F. Regelman; Quarles & Brady LLP

(57) ABSTRACT

A model newborn human eye which includes a hemispherical-shaped, integrally molded top assembly comprising a visually transparent cornea portion surrounding a visually opaque sclera portion in combination with a hemispherical-shaped bottom assembly comprising a bowl-shaped substrate disposed therein. The model newborn human eye further comprises a retinal layer comprising a two dimensional image of retinal vasculature disposed on said substrate, where the model newborn human eye is dimensioned for diagnosing Retinopathy of Prematurity ("ROP") in premature infants.

11 Claims, 16 Drawing Sheets

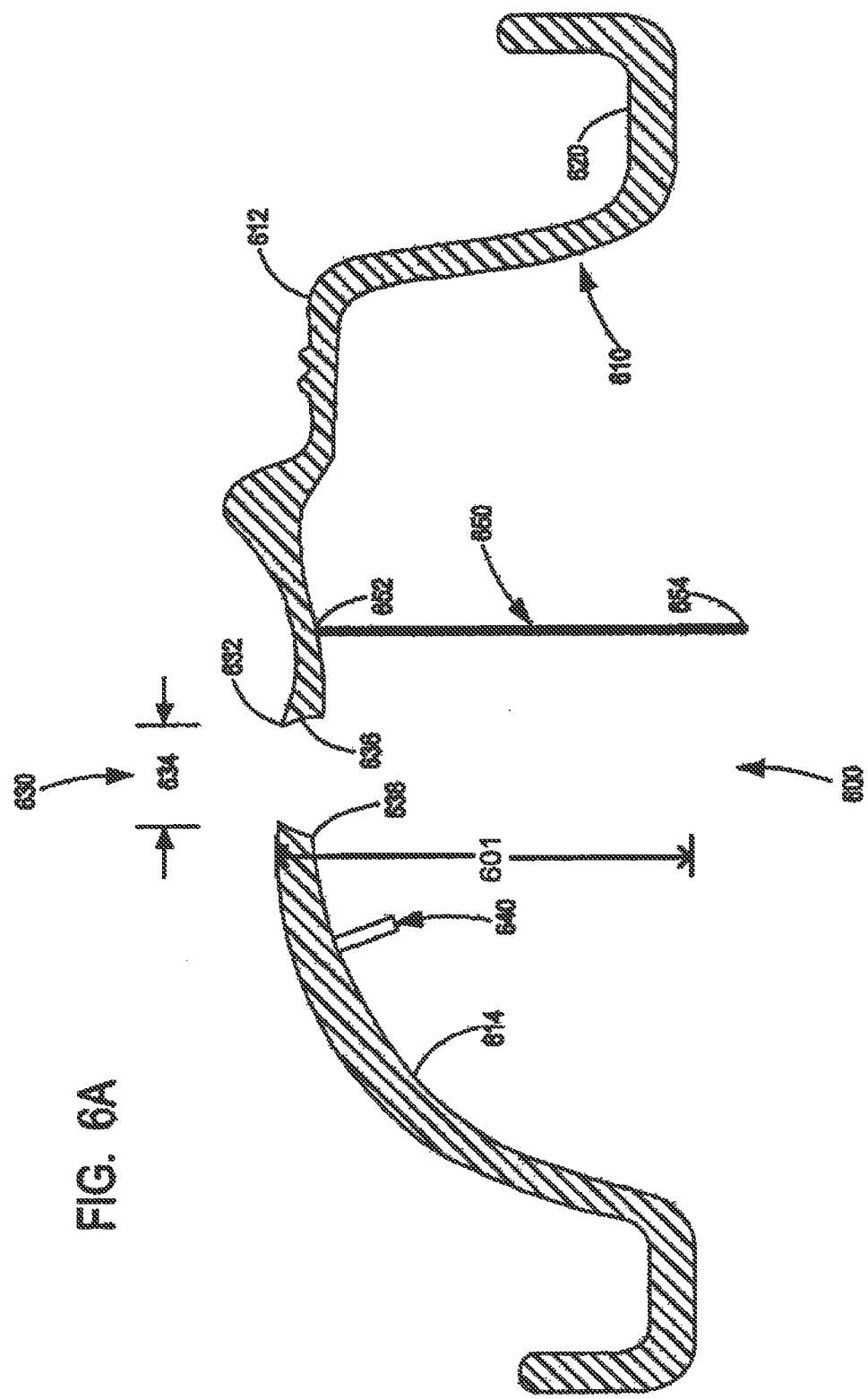

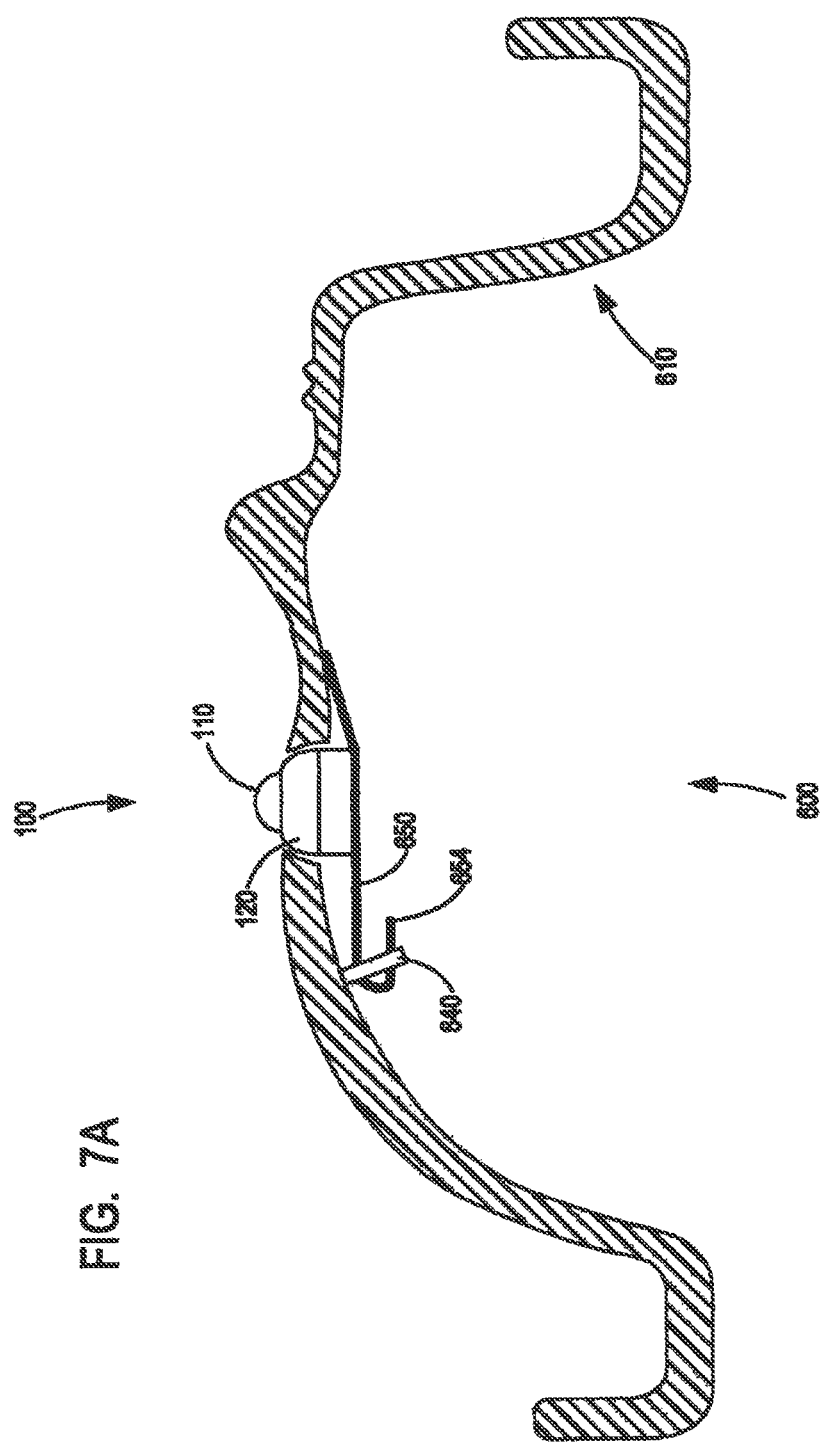

MODEL NEWBORN HUMAN EYE AND FACE MANIKIN

CROSS-REFERENCE TO RELATED APPLICATIONS

This Application claims priority to a U.S. Provisional Application filed Jun. 3, 3013 and having Ser. No. 61/830,528.

FIELD OF THE INVENTION

This invention relates to a model newborn human eye for pedagogical use by medical professionals.

BACKGROUND OF THE INVENTION

Medical students, interns, residents, and fellows, specializing in diagnosing and treating injuries to, and the diseases of, the eye must necessarily practice certain surgical techniques prior to actually operating on human patients. Prior art training methods often use animal eyes, such as, for example human cadaver eyes or cow eyes.

The use of human cadaver and/or animal eyes (collectively "biological eyes") is burdened with many procedural issues. The biological eyes must be refrigerated before use, and even when refrigerated suffer from a short "shelf life" due to inevitable biological decomposition. The handling of such biological eyes requires compliance with, among other regulations, the Blood Born Pathogens Standard promulgated under the federal Occupational Health and Safety Act. After use, the biological eyes must be properly disposed of.

What is needed is a model newborn human eye that closely mimics the anatomy and physiology of the human eye, but which does not require refrigeration and other special handling procedures.

SUMMARY OF THE INVENTION

Applicants' invention comprises a model newborn human eye that can be used for surgical training purposes, including practicing neonatal surgical procedures. The model newborn human eye comprises a hemispherical-shaped bottom assembly having a bowl-shaped substrate disposed therein and a hemispherical-shaped top portion attached to the bottom portion, the top portion comprising a visually transparent cornea portion and a visually opaque sclera portion, wherein the cornea portion and the sclera portion are integrally molded.

Applicants' model newborn human eye mimics the dimensions of the eye of a newborn or premature infant. Such embodiments are structurally suited for practicing neonatal medical procedures, including pediatric retinal imaging.

In certain embodiments, Applicants' invention further comprises a newborn face manikin formed to mimic a newborn/neonatal human face comprising a raised, face-mimicking structure surrounded by a trough, where the face-mimicking structure comprises an eye socket extending there through, an exterior surface, and an interior surface. In certain embodiments, the newborn face manikin is dimensioned to mimic a newborn or premature infant.

One or more of Applicants' model newborn human eyes can be releaseably disposed in the newborn face manikin such that the cornea portion extends outwardly from the eye socket. Various surgical procedures can then be practiced using one or both of the model infant eyes. The used model newborn human eyes can then be removed from the newborn face manikin, and those used model infant eyes can be retained for study or discarded. New newborn human model infant eyes can be disposed in the newborn face manikin and the surgical procedure practiced a plurality of times.

BRIEF DESCRIPTION OF THE DRAWINGS

The invention will be better understood from a reading of the following detailed description taken in conjunction with the drawings in which like reference designators are used to designate like elements, and in which:

FIG. 6A is a cross-sectional view of Applicants' newborn face manikin formed to releaseably accept Applicants' model newborn human eye;

FIG. 7A shows the newborn face manikin of FIG. 6A with a model newborn human eye removeably affixed thereto.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicants' invention comprises a model newborn human eye that closely mimics the anatomy and physiology of the human eye and is structurally suited to allow physicians to meaningfully practice surgical procedures utilizing their own equipment and instruments. By "structurally suited" Applicant means that the present invention is so configured that training methods utilizing Applicants' model newborn human eye closely mimic surgical procedures performed on actual newborns/infants.

The human eye grows very little from birth to adulthood. A newborn's eye measures about 0.7 inches from front to back—approximately 70 percent of the size of an adult's eye. This is why babies' eyes seem large in proportion to their heads. During infancy, the eyeball grows just 1 millimeter, to a length of about 0.74 inches. The eye continues to grow gradually throughout childhood until it reaches a length of about 1 inch in adulthood. The protective skull cavity where the eyeball rests, sometimes called the eye socket, grows along with the eyeball. The dimensions of Applicants' newborn/infant model infant eye mirror the dimensions recited hereinabove.

Figure 1:
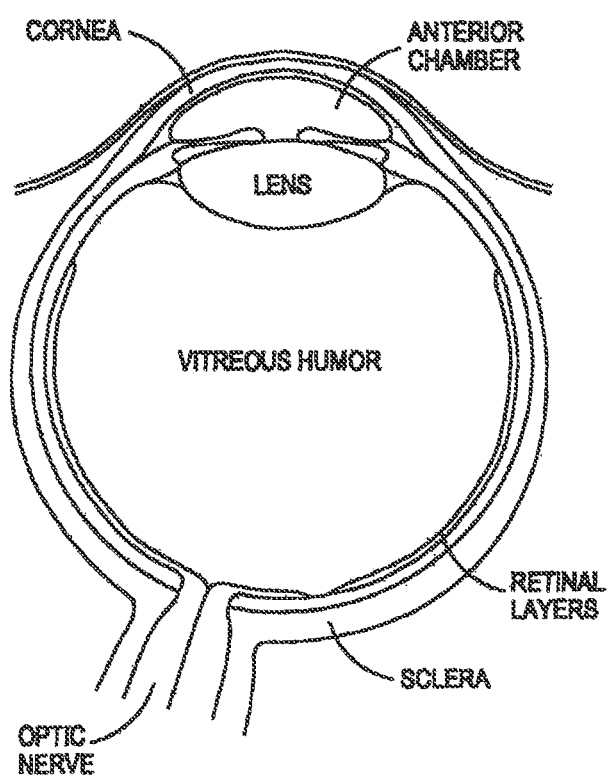
FIG. 1 illustrates a human eye.

Referring now to FIG. 1, the human eye comprises outer layers which include the cornea and the sclera. These layers enclose an anterior chamber disposed in front of the lens, and a larger posterior chamber disposed behind the lens. The anterior chamber is filled with a watery aqueous humor, and the posterior chamber is filled with a jelly-like vitreous body.

Figure 2:
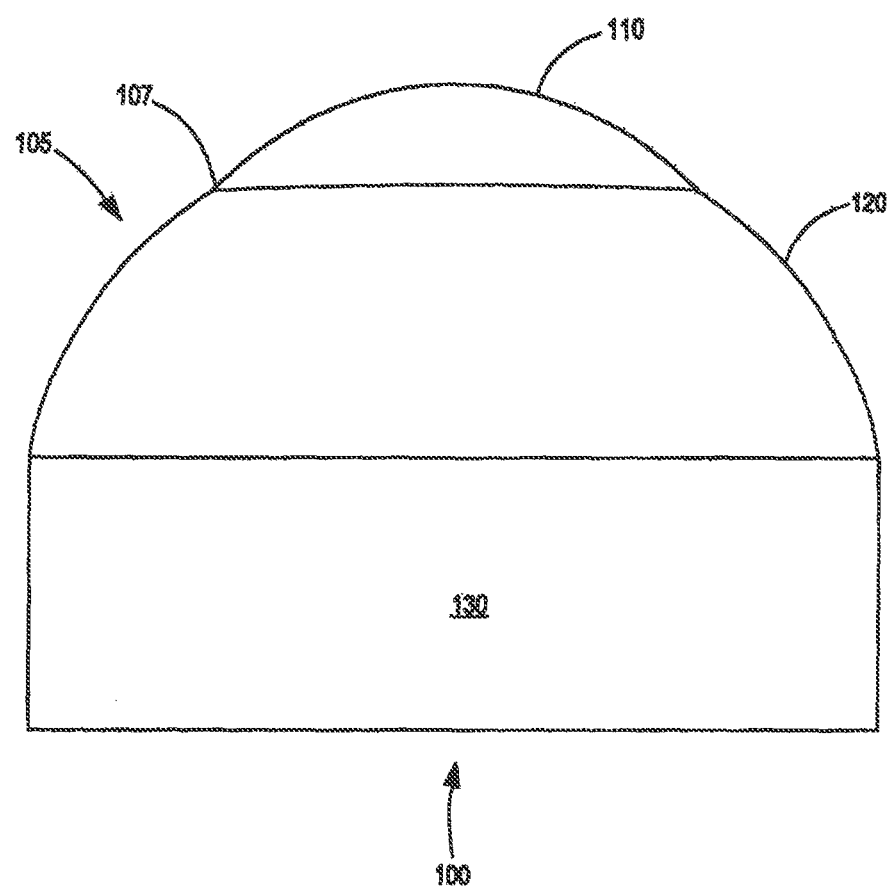
FIG. 2 is a perspective view of Applicants' model infant eye.

Referring now to FIG. 2, Applicants' model newborn human eye 100 is formed from subassemblies 105 and 130. Sub-assembly 105 comprises cornea portion 110 and sclera portion 120. In certain embodiments, assembly 105 is molded as an integral part. In certain embodiments, assembly 105 is formed by liquid injection molding. In certain embodiments, assembly is formed by injection molding a silicone resin. In certain embodiments, that silicone resin comprises polydimethylsiloxane. In certain embodiments, that silicone resin comprises an elastomeric polydimethylsiloxane.

In certain embodiments, the portion of the mold used to form sclera portion 120 comprises a plurality of microscopic protuberances, i.e. a relatively "rough" surface microscopically. As a result, the molded sclera portion 120 diffracts visible light, and therefore, is visually opaque. In contrast, the portion of the mold used to mold cornea portion 110 does not comprise such microscopic roughness. As a result, cornea portion 110 comprises a smooth surface and does not diffract visible light, and is visually transparent. Border 107 defines the intersection of transparent cornea portion 110 and visually opaque sclera portion.

A human cornea comprises a varying thickness, wherein that thickness is greatest at the periphery and decreases to a minimum thickness in the middle. Cornea portion 110 is formed to mimic the varying thickness of a human infant. Central corneal thickness is significantly greater in full-term infants than in adults. Babies born at approximately 31 weeks have very thick corneas which show a progressive and statistically significant decrease to term. Conversely, horizontal corneal diameter shows a progressive significant increase to term.

The mean central corneal thickness (CCT) in infants has been measured to be 585±52 nm (ranging from 446-706 nm). The mean peripheral corneal thickness (PCT), significantly thicker than CCT (P=0.0001), was: superior (SCT) 696±55/zm, inferior (ICT) 744±62 nm, nasal (NCT) 742±58 lim, and temporal (TCT) 748±55 nm.

Figure 3:
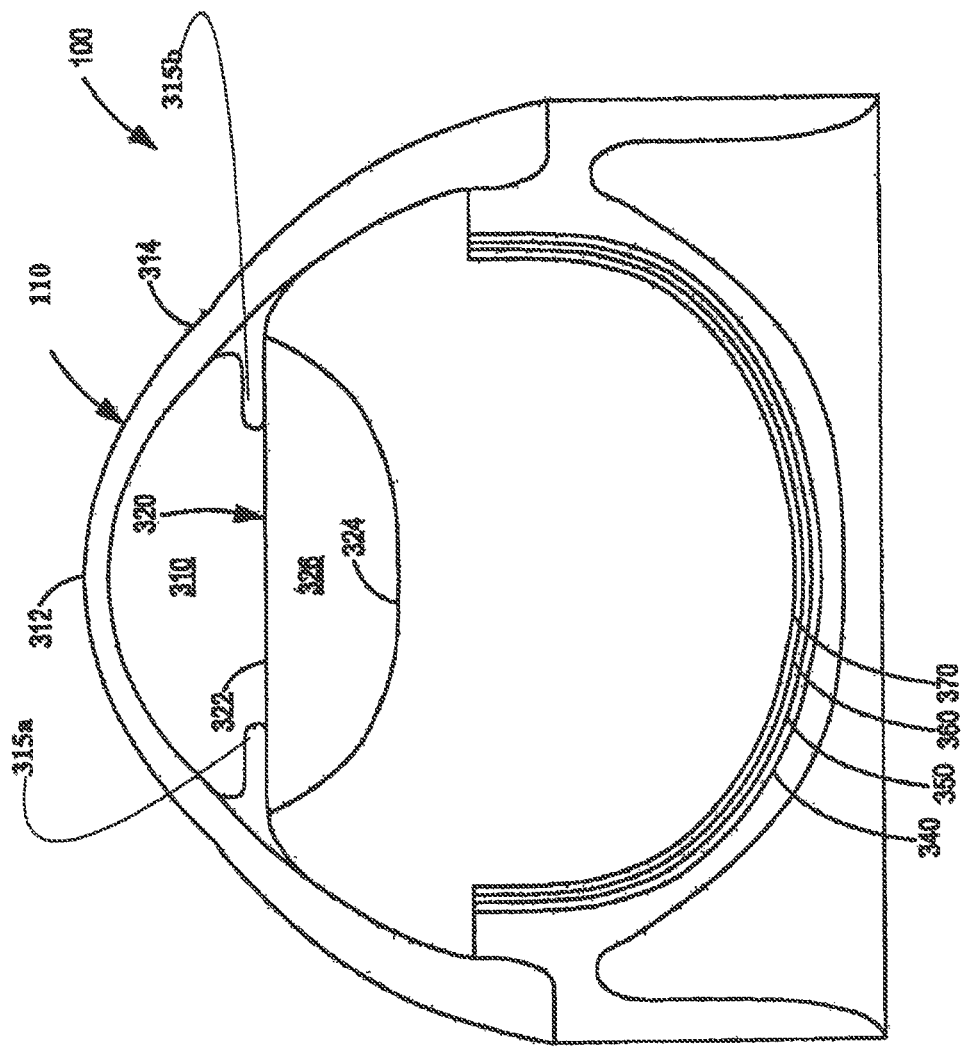
FIG. 3 is a first cross-sectional view of Applicants' model infant eye.

Referring now to FIG. 3, cornea portion 110 comprises center point 312. Cornea portion 110 is formed to comprise a minimum thickness between about 0.50 mm and about 0.60 mm at center point 312. Cornea portion 110 is formed to comprise a maximum thickness of between about 0.7 mm and about 0.8 mm at periphery 314 of cornea 110.

Applicants' model infant eye 100 further comprises iris 315 and a lenticular bag 320 disposed therein. FIG. 3 shows iris portion 315a and iris portion 315b. As those skilled in the art will appreciate, iris portions 315a and 315b comprise a portion of a continuous, annular iris structure, wherein that annular iris element is continuously attached to an inner surface of assembly 105 along border 107. In certain embodiments the distal ends of iris portions 315a and 315b are separated by a distance 316. Distance 316 can be varied. In certain embodiments, distance 316 is 8 mm.

Lenticular bag 320 is continuously attached to iris 315. Iris 315 in combination with lenticular bag 320 and with a portion of the inner surface of assembly 105 disposed above the iris define anterior chamber 310. Anterior chamber 310 is filled with a first fluid having a first viscosity. In certain embodiments, the first fluid comprises a viscosity of water.

In the illustrated embodiment of FIG. 3, Applicants' lenticular bag 320 comprises anterior capsular membrane 322 and posterior capsular membrane 324. In certain embodiments, anterior capsular membrane 322 is formed from Mylar "A." Capsular thickness is associated significantly with age, and increases gradually (1.2% per year) until age 75, after which a slight decrease is observed. In certain embodiments, anterior capsular membrane 322 comprises a thickness of about 0.005 mm. Applicant has found that Mylar A comprises a tear initiation strength and a tear propagation strength that is essentially the same as the tear initiation strength and the tear propagation strength of an adult anterior capsular membrane.

In certain embodiments posterior capsular membrane 324 comprises a hemi-spherical shape. In certain embodiments, posterior capsular membrane comprises a parabolic shape. In certain embodiments, posterior capsular membrane 324 is formed from glycol-modified polyethylene terephthalate. In certain embodiments, posterior capsular membrane 324 comprises a thickness of about 0.25 mm.

Lenticular bag 320 is filled with fluid 326. Fluid 326 is adjusted such that lenticular bag 320 mimics the physical attributes of a human lens. In certain embodiments, fluid 326 comprises an aqueous solution comprising gelatin. In certain embodiments, fluid 326 comprises gelatin, agar, propylene glycol, water, and a preservative. In certain embodiments, fluid 326 further comprises a colorant. In certain embodiments, that colorant comprises a yellow tint. In certain embodiments, that colorant comprises a gray tint. In certain embodiments, the colorant is selected such that lenticular bag 320 mimics a lens found in an elderly human patient.

Filled lenticular bag 320 mimics the capsule surrounding the lens in the human eye. In a normal human eye, the lens is surrounded by a capsule which separates the lens from the vitreous, which is a third fluid disposed in chamber 330 located in the back of the eye, and the aqueous, which is the first fluid disposed in anterior chamber 310 located in the front of the eye. The second fluid disposed in posterior chamber 330 comprises a second viscosity, wherein the second viscosity is greater than the first viscosity. This capsule comprises an anterior portion separating the lens from the aqueous humor, and a posterior portion separating the lens from the vitreous humor.

A vitrectomy is a surgery to remove some or all of the vitreous humor from the eye and may be performed when the retina has detached from the wall of the eye. During a vitrectomy a surgeon inserts a small instrument into the eye and suctions out some or all of the vitreous gel. After the vitreous humor is removed, the surgeon may treat the retina by photocoagulation, by removing fibrous or scar tissue from the retina, by flattening areas where the retina has become detached, or by repairing tears or holes in the retina or macula. Embodiments of Applicants' model newborn human eye 100 can be used to practicing performing a vitrectomy.

Figure 4:
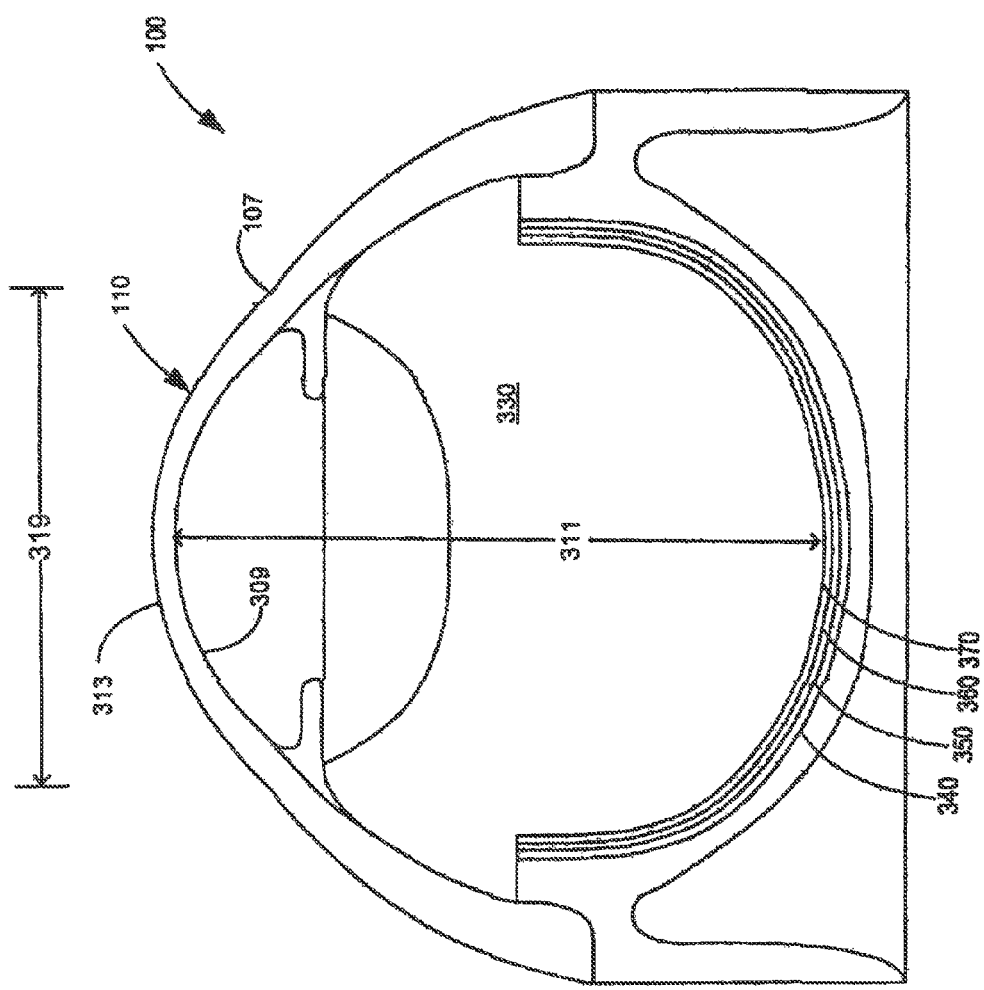
FIG. 4 is a second cross-sectional view of Applicants' model infant eye.

Referring now to FIGS. 3 and 4, the human eye comprises a plurality of retinal layers disposed along the posterior interior surface. In certain embodiments, Applicants' model infant eye 100 similarly comprises a plurality of layers, namely layers 350, 360, and 370, disposed in a stack disposed on the curved surface 340 of posterior chamber 330. In certain embodiments, layer 370 comprises a blue color. In certain embodiments, layer 360 comprises a white color. In certain embodiments, layer 350 comprises a red color. In certain embodiments, each layer 350, 360, and 370, are separately formed. In certain embodiments, layers 350, 360, and 370, comprise a thickness between about 0.0002 to about 0.0006 inches.

While FIGS. 3 and 4 depict three retinal layers, namely layers 350, 360, and 370, in certain embodiments, Applicants' model newborn human eye 100 may have less than three layers or more than three layers.

Referring to FIG. 4, in certain embodiments, Applicants' model newborn human eye 100 approximates the dimensions of a newborn human eye. In such embodiments distance 311 is between approximately 15 mm and approximately 19 mm and diameter 319 is between approximately 9.5 mm and 10.5 mm. In certain such embodiments distance 311 is approximately 16.5 mm and diameter 319 is approximately 10 mm.

In yet other embodiment Applicants' model infant eye 100 approximates the dimensions of an infant eye. In certain embodiments, distance 311 is less than 12 mm and diameter 319 is less than 7 mm.

Figure 6B:
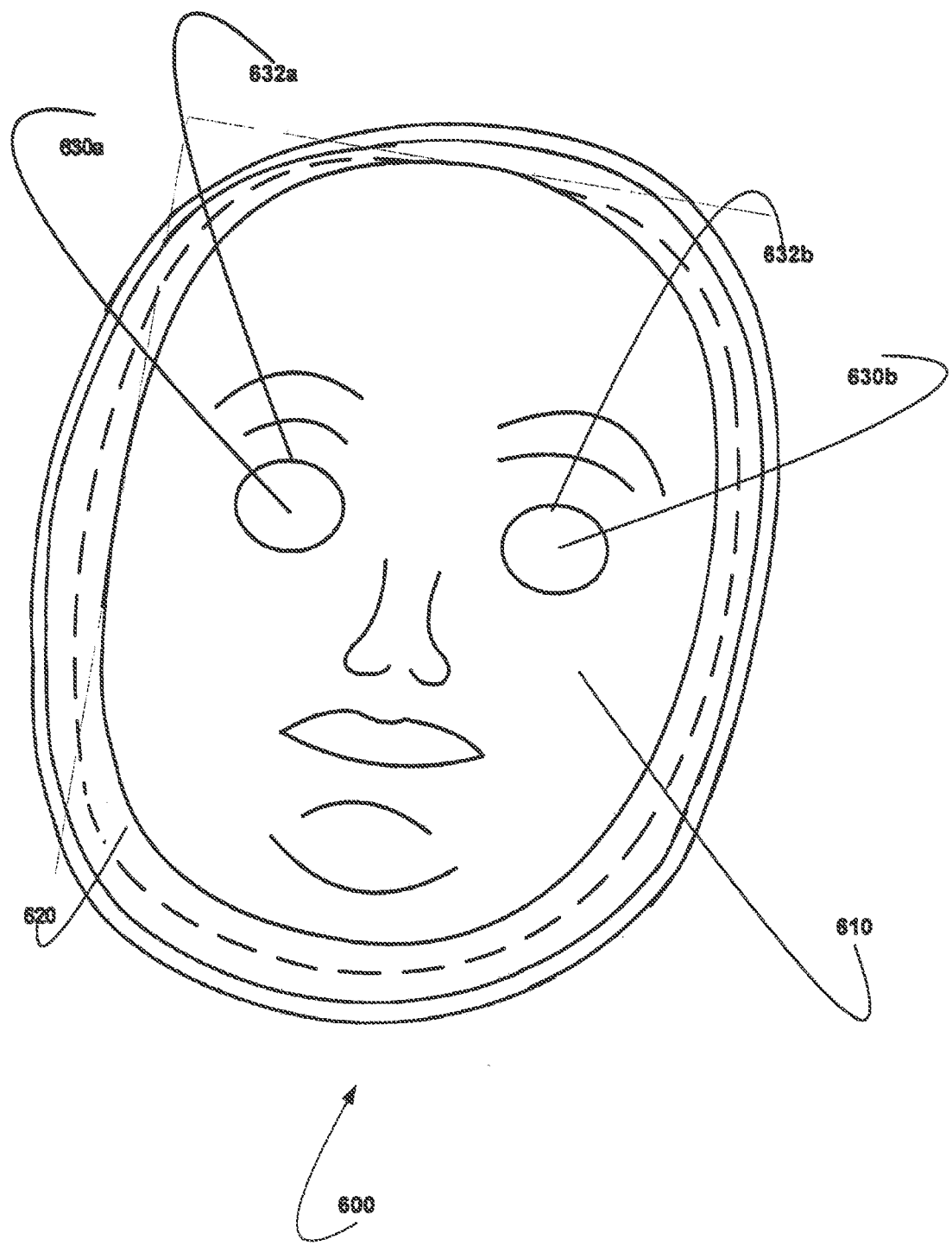
FIG. 6B is a perspective view of the newborn face manikin of FIG. 6A.

Referring now to FIGS. 6A and 6B, in certain embodiments Applicants' invention further comprises a newborn face manikin 600 formed to mimic the facial architecture of a human infant face. A typical baby face varies from the archetypal adult face in the following manner: (i) bigger eyes in proportion to its face, (ii) rounder face, (iii) plumper cheeks, (iv) larger head in proportion to its face, (v) short, flat eyebrows, and (vi) short, relatively small, turned up nose.

Newborn face manikin 600 comprises a raised, face-mimicking structure 610 surrounded by a trough 620. Many of the surgical procedures that can be learned and refined using Applicants' model infant eye 100 in combination with newborn face manikin 600 involve the use of water and/or other fluids. As those fluids drain down structure 610, trough 620 comprises an integral containment system to capture those fluids.

Face-mimicking structure 610 comprises an outer surface 612 and an inner surface 614. Face-mimicking structure 610 is formed to include two apertures 630 formed therein. Apertures 630 comprise eye sockets.

In the illustrated embodiment of FIG. 6A, eye socket 630 is defined by a circular wall 636. Circular wall 636 comprises an arcuate shape comprising a first circumference 632 at outer surface 612 and a second circumference 638 at inner surface 614, wherein the first circumference 632 is less than the second circumference 638. In certain embodiments, arcuate wall 636 comprises a radius of curvature of about 12 mm.

The arcuate shape of wall 636 allows Applicants' model infant eye 100, when fixtured to newborn face manikin 600, to be manually rotated in small increments with respect to the surrounding eye socket 630. Such movement of Applicants' model infant eye 100 within eye socket 630 closely mimics the actual movement of a human eye.

In certain embodiments, newborn face manikin 600 approximates the facial architecture of an infant. In other embodiments, newborn face manikin 600 approximates the facial architecture of a premature infant.

Newborn face manikin 600 further comprises a flexible attachment strap 650, wherein a first end of strap 650 is attached to interior surface 614. Newborn face manikin 600 further comprises a buckle assembly attached to interior surface 614, wherein buckle assembly 640 is attached to interior surface 614 adjacent a first side of eye socket 630, and one end of flexible strap 650 is attached to interior surface 614 adjacent an opposing second side of eye socket 630. In certain embodiments, one surface of distal end 654 of strap 650 comprises a plurality of loop-type fasteners, and a second and opposing surface of distal end 654 comprises a plurality of hook-type fasteners.

Figure 7B:
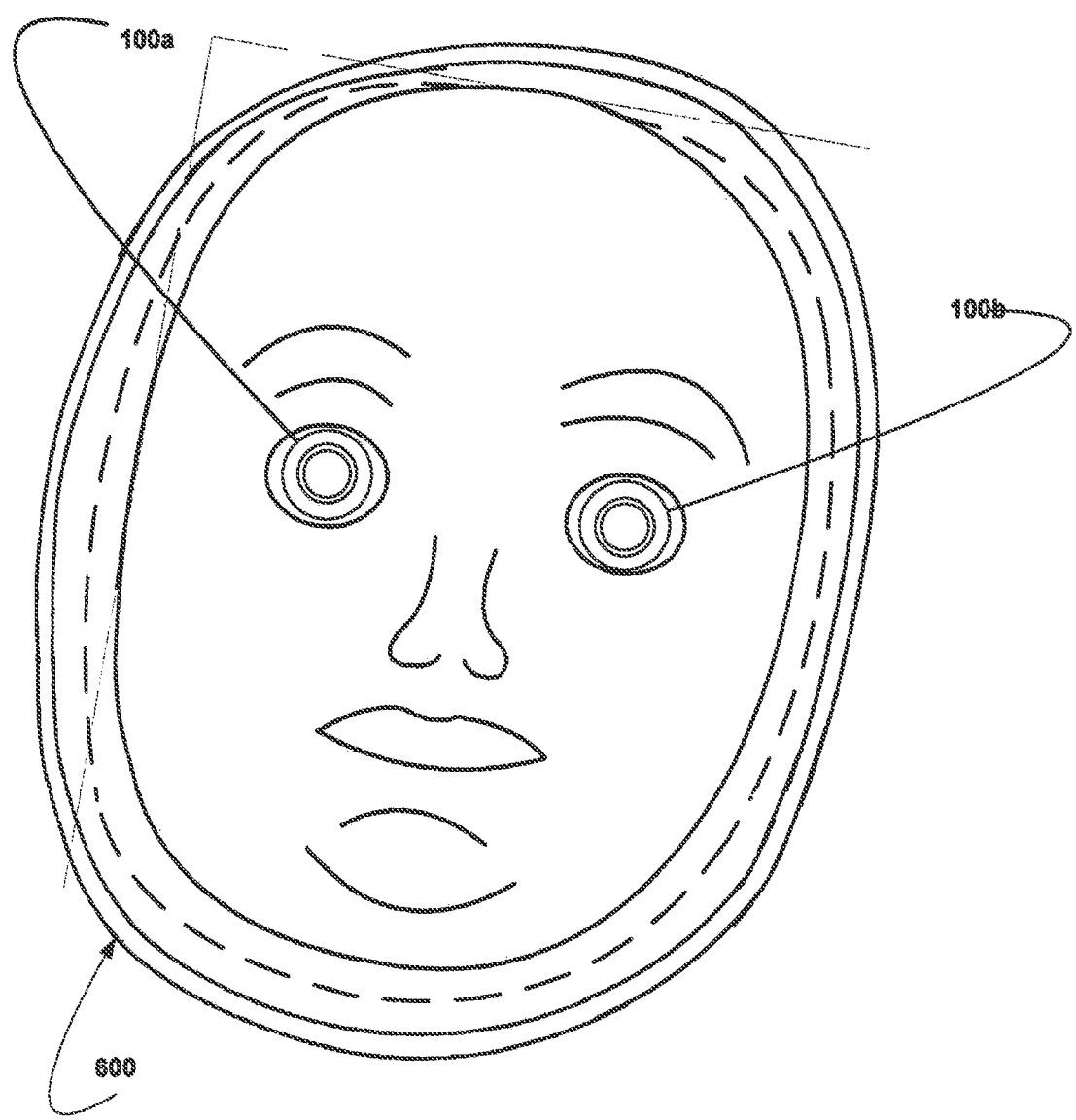
FIG. 7B is a perspective view of the newborn face manikin of FIG. 6A with two model newborn human eyes removeably affixed thereto.

Referring now to FIGS. 7A and 7B, FIG. 7A shows Applicants' model infant eye 100 removeably attached to newborn face manikin 600 such that cornea portion 110 and a portion of sclera 120 extend through eye socket 630. In the illustrated embodiment of FIG. 7A, distal end 654 of flexible strap 650 is shown threaded through buckle 640, such that flexible strap 650 fixtures model infant eye in place. The model infant eye 100 element can be used for one or more surgical procedures, and then replaced with a new model infant eye 100. The used model infant eyes can be retained for evaluation. Thereafter, the used model infant eyes 100 can be classified as solid waste rather than as a hazardous waste or infectious waste for purposes of the federal Occupational Safety and Health Act, Resource Conservation and Recovery Act, and the various state-law analogs.

Figure 5A:
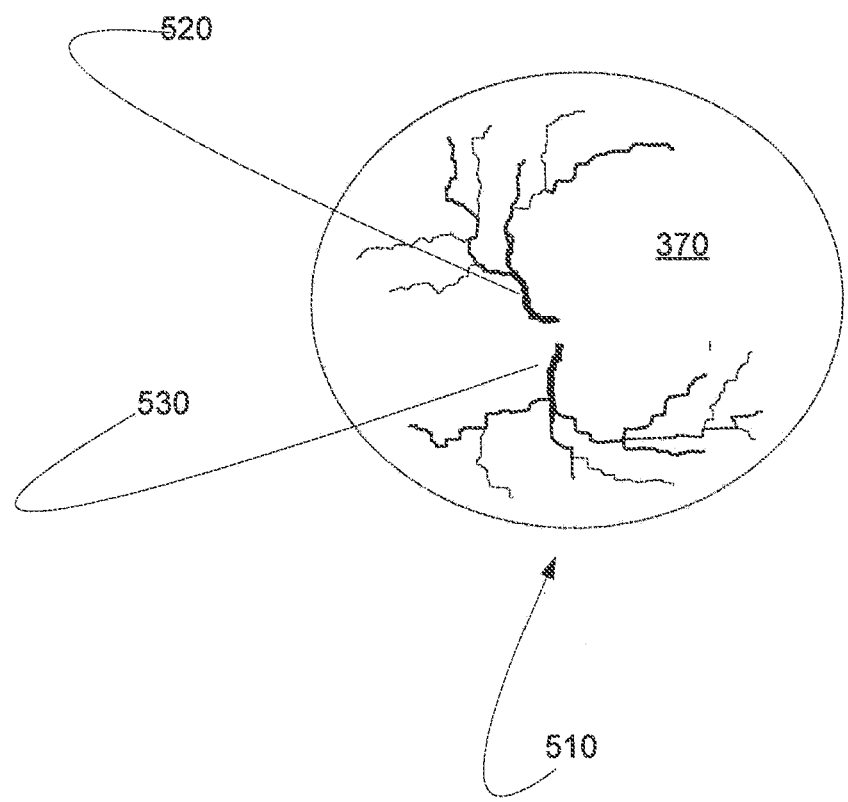
FIG. 5A illustrates a first embodiment of Applicants' retinal vasculature shown disposed on a top surface of a retinal layer of Applicants' model newborn human eye.

Referring now to FIG. 5A, retinal vasculature 510 is shown disposed on a top surface of a retinal layer of Applicants' model newborn human eye 100, such as retinal layer 370. In certain embodiments, retinal vasculature 510 is printed on, sprayed on, or molded into the retinal layer. In other embodiments, other known means may be used to depict the representation on a retinal layer. Embodiments of Applicants' model newborn human eye 100 having a representation of retinal vasculature 510 depicted on a retinal layer can be used to practice correctly imaging the retina, and in particular imaging the retina using pediatric retinal imaging systems.

Figure 5B:
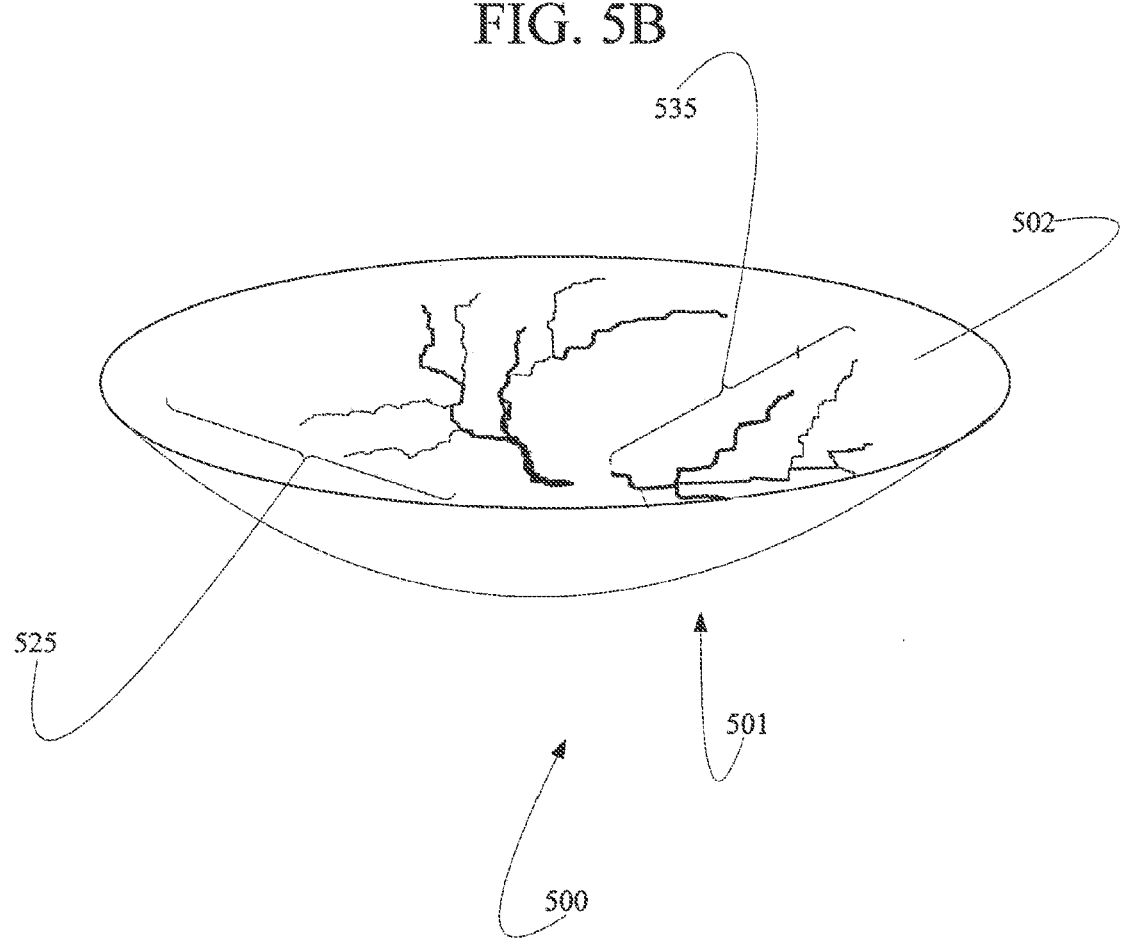
FIG. 5B illustrates a portion of a mold used to form a 3-D depiction of the retinal vasculature of FIG. 5A.

In the illustrated embodiment of FIG. 5A, retinal vasculature 510 comprises vasculature feature 520 and vasculature feature 530. In certain embodiments, Applicants form a three-dimensional ("3-D") depiction of vasculature feature 520 and vasculature feature 530. FIG. 5B shows a portion of a mold 500 used to form such a 3-D depiction of vasculature feature 520 and vasculature feature 530.

In certain embodiments, mold 500 is utilized in an injection molding process. In certain embodiments, mold 500 is utilized in a reaction injection molding process. In certain embodiments, mold 500 is utilized in a resin transfer molding process. In certain embodiments, mold 500 is utilized in an injection molding process. In certain embodiments, mold 500 is utilized in a thermoforming molding process.

Mold 500 comprises a bowl-shaped mold platen 501 comprising an interior surface 502. Surface 502 is formed to include a set of recessed grooves 525 comprising a "negative"

image of retinal vasculature 520, and a set of recessed grooves 535 comprising a "negative" image of retinal vasculature 535.

Figure 5C:
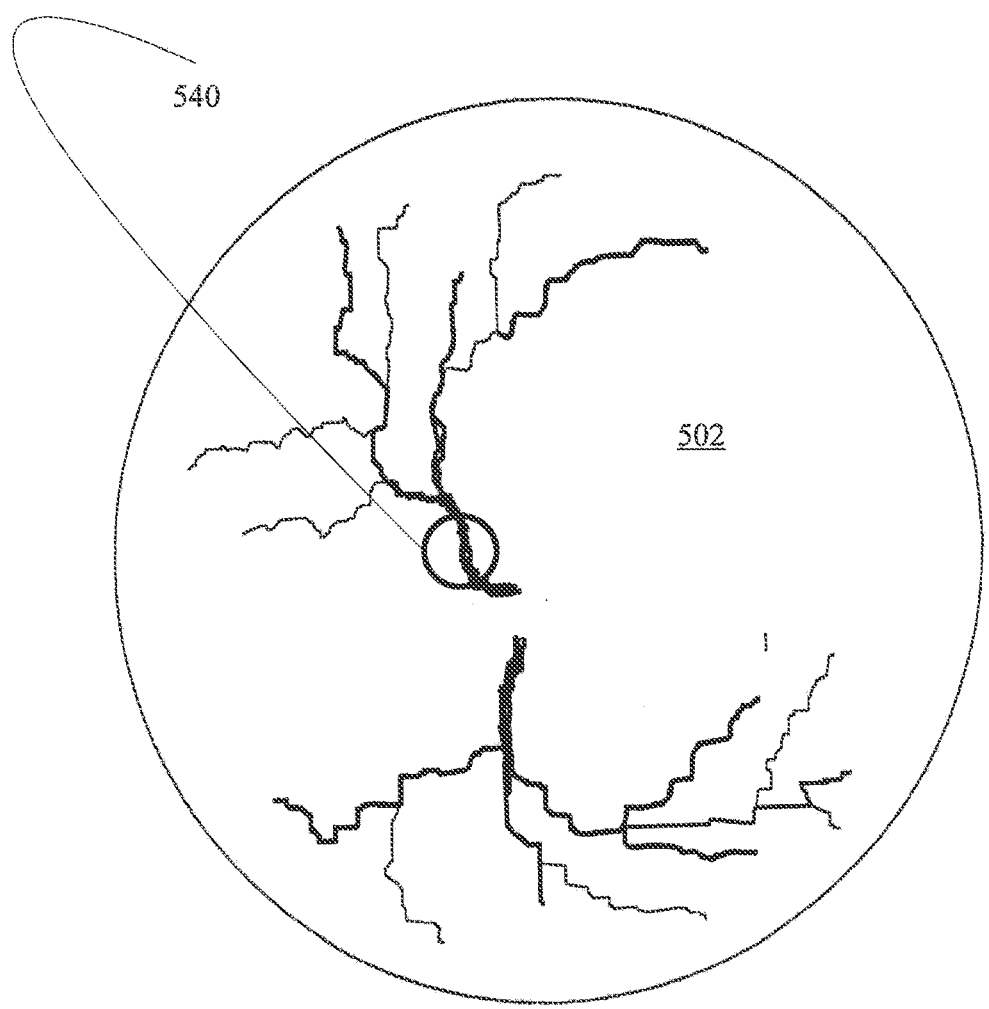
FIG. 5C a top view of an interior surface of the mold of FIG. 5B.
Figure 5D:
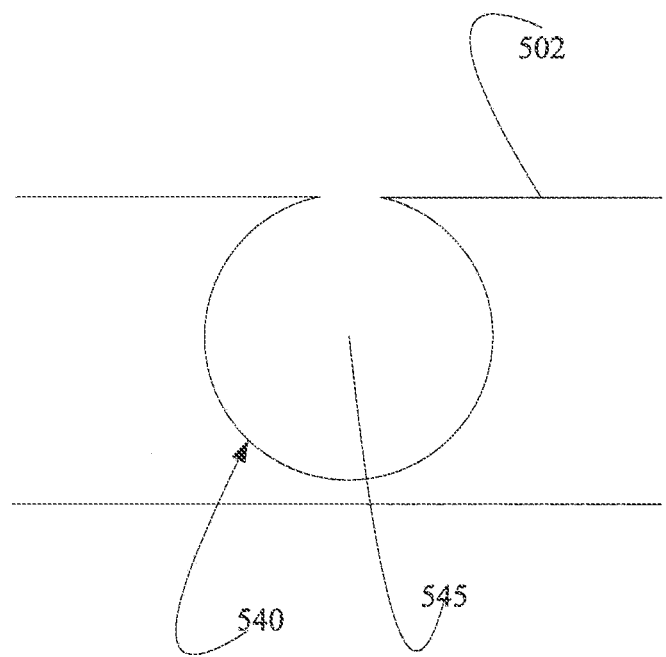
FIG. 5D is a cross-sectional view of a mold platen showing a portion of grooves disposed therein.
Figure 5E:
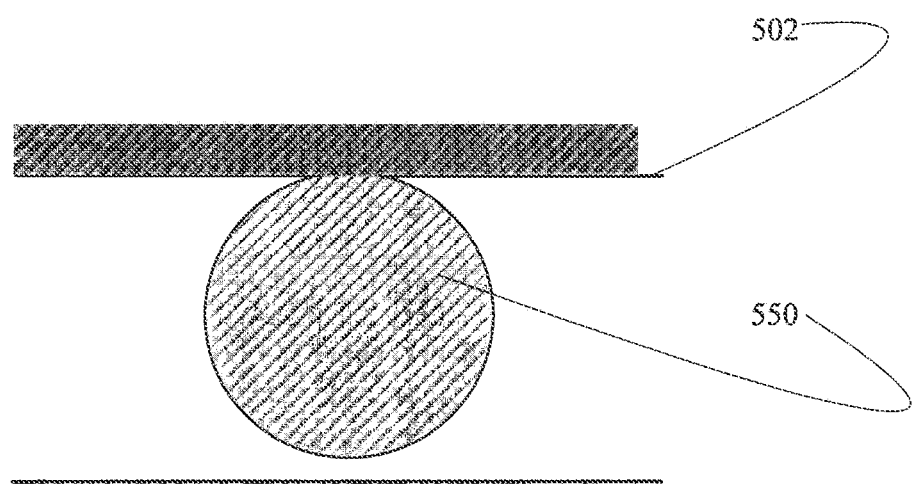
FIG. 5E illustrates an elastomeric material disposed over a surface of mold the mold of FIG. 5B, where the elastomeric material has filled a recessed groove.
Figure 5F:
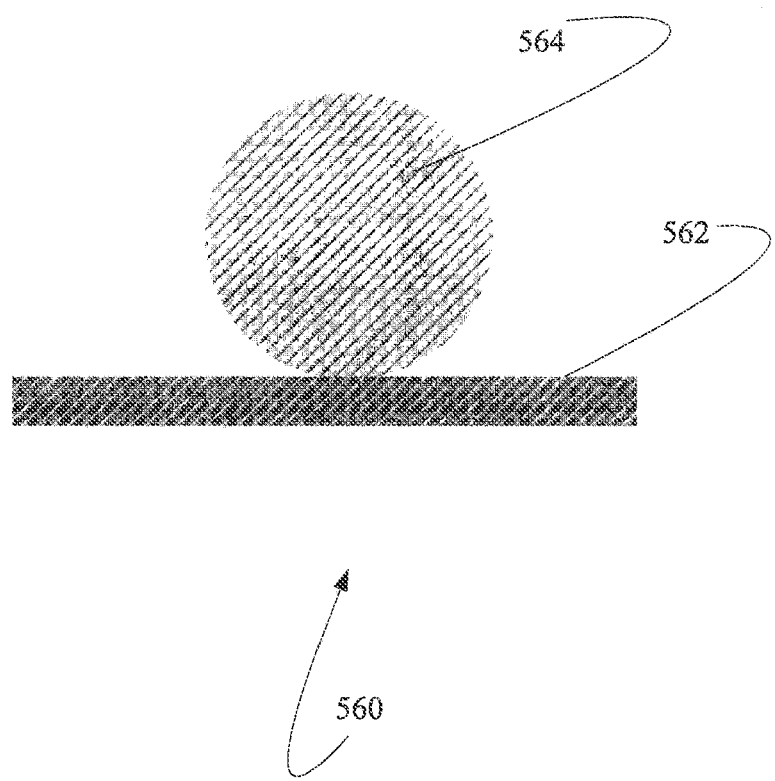
FIG. 5F illustrates a cross-sectional view of a portion of 3-D elastomeric retinal vasculature disposed on an elastomeric base.

FIG. 5C is a top view of interior mold surface 502, wherein a portion 540 of recessed grooves 525 is indicated. FIG. 5D is a cross-sectional view of mold platen 501 showing portion 540 of grooves 525. FIG. 5E illustrates an elastomeric material 550 disposed over interior surface 502 of mold 500 and filling a portion of recessed groove 545. FIG. 5F shows a cross-sectional view of 3-D elastomeric vasculature portion 564 of Applicants' 3-D rendition of retinal vasculature 520 disposed on an elastomeric base 562. Applicants' 3-D depiction of retinal vasculature 520 and 530 is formed by disposing an elastomer and/or an elastomeric precursor into recessed grooves 525, and into recessed grooves 535, and onto bowl-shaped interior mold surface 502, and, if necessary, curing the elastomeric precursor. Applicants' 3-D depiction of retinal vasculature 520 and 530 can then be disposed on top of retinal layer 370.

Figure 5G:
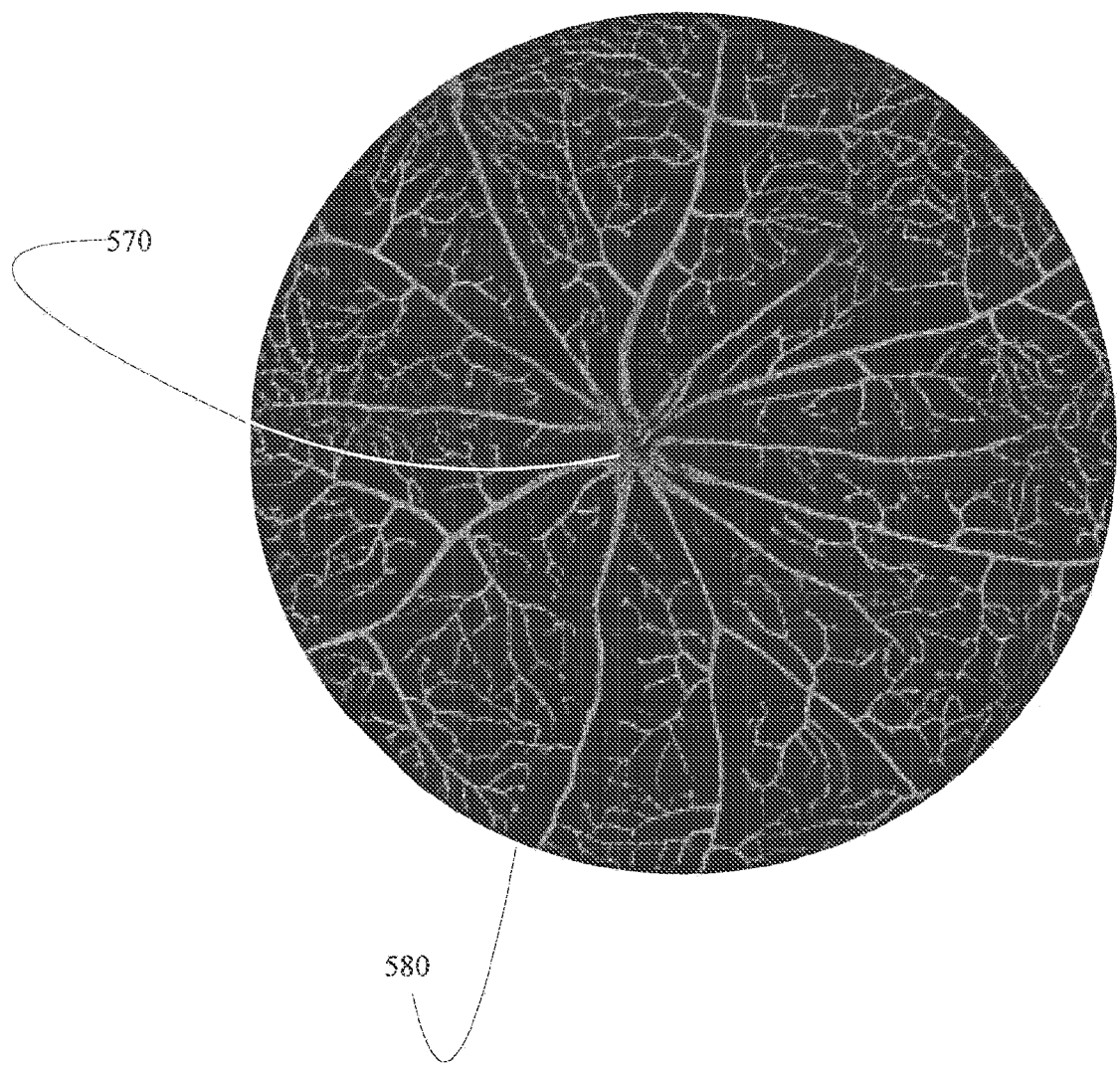
FIG. 5G illustrates a second embodiments of Applicants' 3-D retinal vasculature disposed on a black elastomeric substrate.

FIG. 5G illustrates a second embodiment of Applicants' 3-D retinal vasculature 570 disposed on a black elastomeric substrate 580. In other embodiments, Applicants' vasculature 570 is red and is disposed on a transparent elastomeric substrate.

Applicants' model newborn human eye 100 and newborn face manikin 600, both preferably approximating the dimensions of a newborn or premature infant eye and face respectively, and including a 2-D image of, or a 3-D elastomeric rendition of, retinal vasculature disposed on retinal layer 370, can be used to practice diagnosing and surgically treating Retinopathy of Prematurity ("ROP") in premature infants. ROP is an eye disease that affects prematurely born babies and is caused by abnormal growth of the retinal blood vessels. While some mild cases of ROP will resolve on their own, more severe cases result in scaring and even retinal detachment. On method of diagnosing ROP is to use a pediatric retinal imaging system. During such an examination, a speculum is used to separate the eye lids and a hand held camera is placed on the cornea interfaced with an ophthalmic lubricant. The camera is used to quickly scan the premature infant's retina for abnormal blood vessels. However, care must be taken when performing the exam not to compress the eye, thus potentially influencing retinal blood flow and affecting evaluation of the presence of ROP. Additionally, even minor pressure can cause hemorrhages in infant retinas. Embodiments of Applicants' model newborn human eye 100, preferably having at least one retinal layer and the approximate dimensions of the average newborn human eye or premature infant eye, can be used to practice correctly imaging the retina using pediatric retinal imaging systems. Additionally, embodiments of Applicants' newborn face manikin 600, likewise having the dimensions of the average newborn human or premature infant face, can be used with model infant eye 100 to more accurately simulate imaging the retina on an infant.

In advanced cases of ROP, surgical treatment may be required. Most commonly a peripheral retinal ablation is performed using a solid state laser photocoagulation device to destroy avascular portions of the periphery of the retina. An incorrectly performed peripheral retinal ablation can result in loss of vision as well as continued progression of the disease. Embodiments of Applicants' model newborn human eye 100 having at least one retinal layer can be used to practice performing a peripheral retinal ablation. Further, embodiments of Applicants' model newborn human eye 100 having the approximate dimensions of the average newborn human eye or premature infant eye can be used to practice performing a peripheral retinal ablation on an infant. Additionally, embodiments of Applicants' newborn face manikin 600, likewise having the dimensions of the average newborn human or premature infant face, can be used with model infant eye 100 to more accurately simulate performing a peripheral retinal ablation on an infant.

Cryotherapy may also be used to treat ROP in premature infants. With cryotherapy, a probe is used to briefly touch and freeze spots on the retina. Embodiments of Applicants' model newborn human eye 100 having at least one retinal layer can be used to practice performing cryotherapy. Further, embodiments of Applicants' model newborn human eye 100 having the approximate dimensions of the average newborn human eye or premature infant eye can be used to practice performing cryotherapy on an infant. Additionally, embodiments of Applicants' newborn face manikin 600, likewise having the dimensions of the average newborn human or premature infant face, can be used with model infant eye 100 to more accurately simulate performing cryotherapy an infant.

In the most advanced cases of ROP, scaring caused by the abnormal blood vessels can cause the retina to partially, or even completely, detach from the wall of the eye and surgical correction is required to avoid severe visual impairment and possibly blindness. Treatment can include a vitrectomy, as described above. After the vitreous gel has been removed, the scar tissue on the retina can be peeled back or cut away, allowing the retina to relax and lay back down against the eye wall. Embodiments of Applicants' model newborn human eye 100 having at least one retinal layer can be used to practice performing a vitrectomy. Further, embodiments of Applicants' model newborn human eye 100 having the approximate dimensions of the average newborn human eye or premature infant eye can be used to practice performing a vitrectomy on an infant. Additionally, embodiments of Applicants' newborn face manikin 600, likewise having the dimensions of the average newborn human or premature infant face, can be used with model infant eye 100 to more accurately simulate performing a vitrectomy on an infant.

Surgical treatment of ROP can also include scleral buckling wherein a flexible silicone band is placed around the eye and tightened, causing the sclera to buckle towards the retina. This keeps the vitreous gel from pulling on the scar tissue and allows the retina to flatten back down onto the wall of the eye. A subsequent surgery will be needed at a later time to remove the buckle. Embodiments of Applicants' model newborn human eye 100 can be used to practice placing and removing a scleral buckle. Further, embodiments of Applicants' model newborn human eye 100 having the approximate dimensions of the average newborn human eye or premature infant eye can be used to practice placing and removing a scleral buckle on an infant. Additionally, embodiments of Applicants' newborn face manikin 600, likewise having the dimensions of the average newborn human or premature infant face, can be used with model infant eye 100 to more accurately simulate placing and removing a scleral buckle on an infant.

Anterior surface 313 of cornea portion 110 is curved to mimic the corneal curvature of a human eye, wherein the radius of curvature of cornea portion 110 is different than the radius of curvature of sclera 120. In certain embodiments the radius curvature of anterior surface 313 of cornea portion 110 is approximately 7.74 mm. In other embodiments the curvature of anterior surface 313 is approximately 8.33 mm. In yet other embodiments the curvature of anterior surface 313 is approximately 7.26 mm. In still other embodiments the curvature of anterior surface 313 is between approximately 6.75 mm and approximately 8.84 mm.

The corneal curvature of infants is known to be quite steep compared to adults and which flatten within the first few months of birth. In embodiments of Applicants' model newborn human eye 100 which approximate a newborn or premature infant eye, the radius of curvature of anterior surface 313 of cornea portion may be between approximately 6.02 mm and approximately 8.15 mm. In certain such embodiments the radius of curvature of anterior surface 313 is approximately 6.95 mm.

Among the causes of non-accidental head injury (NAHI), shaken baby syndrome (SBS) is difficult to diagnose and is associated with retinal hemorrhages (RH). To identify findings and patterns of RH specific to SBS, a PubMed search using the keywords "shaken baby syndrome" or "child abuse" and "retinal hemorrhage" was conducted; 66 articles met the inclusion criteria. The published data address the utility of RH in three categories: 1) in diagnosing SBS; 2) as correlated to intracranial pathology; and 3) in prognosticating SBS.

Studies disclose a 53-80% incidence of RH with abusive head injury and a 0-10% incidence with proven severe accidental trauma. RHs are found bilaterally 62.5-100% of the time in SBS cases, and flame-shaped hemorrhages are the most common. On the other hand, the incidence of RH from convulsions, chest compressions, forceful vomiting, and severe persistent coughing in the absence of another condition known to cause RH is 0.7%, 0-2.3%, 0%, and 0%, respectively.

SBS remains a difficult cause of NAHI to diagnose. Ophthalmologic examination can provide critical diagnostic and prognostic information in cases of suspected SBS. Child abuse should be highly suspect in children with RH and a parental explanation of accidental head injury, especially if the RHs are found to be bilateral, flame-shaped, or to extend through to all layers of the retina.

Applicants' model newborn human eye 100 and newborn face manikin 600, both preferably approximating the dimensions of a newborn or premature infant eye and face respectively, and including a 2-D image of, or a 3-D elastomeric rendition of, retinal vasculature disposed on retinal layer 370, can be used to practice identification of shaken baby syndrome (SBS).

Figure 5H:
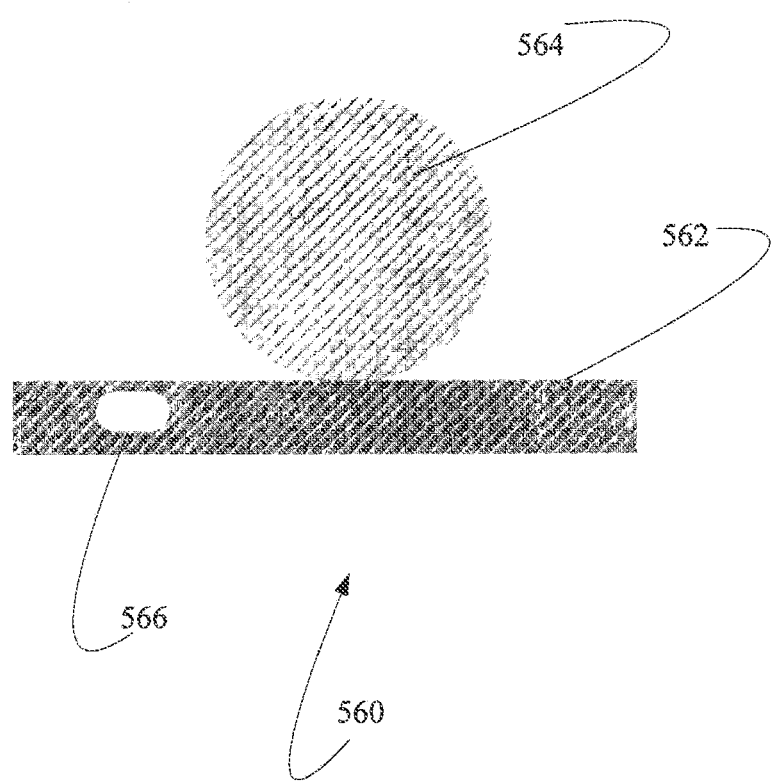
FIG. 5H illustrates Applicants' 3-D retinal vasculature formed on elastomeric substrate and further formed to include a subsurface fluid cavity.

Referring now to FIG. 5H, in certain embodiments Applicants' 3-D retinal vasculature 564 formed on elastomeric substrate 562 is further formed to include one or more fluid cavities 566. Such fluid cavities mimic retinal edemas or cysts, such as without limitation a cystoid macular edema. In these embodiments, Applicants' model newborn human eye 100 and newborn face manikin 600 can be used to practice optical coherence tomography to locate and photograph such subsurface fluid cavities.

Optical Coherence Tomography ("OCT") is a technique for obtaining sub-surface images of translucent or opaque materials at a resolution equivalent to a low-power microscope. It is effectively 'optical ultrasound', imaging reflections from within tissue to provide cross-sectional images. OCT provides tissue morphology imagery at much higher resolution (better than 10 µm) than other imaging modalities such as MRI or ultrasound.

OCT delivers high resolution because it is based on light, rather than sound or radio frequency. An optical beam is directed at the tissue, and a small portion of this light that reflects from sub-surface features is collected. Note that most light is not reflected but, rather, scatters off at large angles. In conventional imaging, this diffusely scattered light contributes background that obscures an image. However, in OCT, a technique called interferometry is used to record the optical path length of received photons allowing rejection of most photons that scatter multiple times before detection. Thus OCT can build up clear 3D images of thick samples by rejecting background signal while collecting light directly reflected from surfaces of interest.

Within the range of noninvasive three-dimensional imaging techniques that have been introduced to the medical research community, OCT as an echo technique is similar to ultrasound imaging. Other medical imaging techniques such as computerized axial tomography, magnetic resonance imaging, or positron emission tomography do not use the echo-location principle.

The technique is limited to imaging 1 to 2 mm below the surface in biological tissue, because at greater depths the proportion of light that escapes without scattering is too small to be detected. No special preparation of a biological specimen is required, and images can be obtained 'non-contact' or through a transparent window or membrane. It is also important to note that the laser output from the instruments is low—eye-safe near-infra-red light is used—and no damage to the sample is therefore likely.

While the preferred embodiments of the present invention have been illustrated in detail, it should be apparent that modifications and adaptations to those embodiments may occur to one skilled in the art without departing from the scope of the present invention.

We claim:

1. A model newborn human eye, comprising:
   a hemispherical-shaped, integrally molded top assembly comprising a visually transparent cornea portion surrounding a visually opaque sclera portion;
   a hemispherical-shaped bottom assembly comprising a bowl-shaped substrate disposed therein;
   a retinal layer comprising a two dimensional image of retinal vasculature disposed on said substrate;
   wherein:
   said top portion is attached to said bottom portion to define a posterior chamber;
   said model newborn human eye is dimensioned for diagnosing Retinopathy of Prematurity ("ROP") in premature infants.

2. The model newborn human eye of claim 1, wherein:
   said retinal layer comprises a three dimensional image of retinal vasculature disposed on said substrate; and
   said model newborn human eye is dimensioned for surgically treating Retinopathy of Prematurity ("ROP") in premature infants.

3. The model newborn human eye of claim 1, wherein:
   said a retinal layer is formed to include a subsurface fluid cavity therein; and
   said model newborn human eye is dimensioned for practicing optical coherence tomography to locate and photograph said subsurface fluid cavity.

4. A method to practice diagnosis and treatment of Retinopathy of Prematurity ("ROP") in premature infants, comprising:
   providing a model newborn human eye dimensioned to mimic an average newborn human eye and comprising a hemispherical-shaped, integrally molded top assembly comprising a visually transparent cornea portion surrounding a visually opaque sclera portion, a hemispherical-shaped bottom assembly comprising a bowl-shaped substrate disposed therein, and a retinal layer disposed on said substrate and comprising retinal vasculature;
   providing a newborn face manikin formed to mimic a newborn/neonatal human face comprising a raised, face-mimicking structure comprising an eye socket extending there through;

releaseably disposing said model newborn human eye in said eye socket such that said cornea portion extends outwardly from said eye socket.

placing a hand held camera on the cornea interfaced with an ophthalmic lubricant; and scanning said retinal vasculature for abnormal blood vessels.

5. The method of claim 4, further comprising performing a peripheral retinal ablation using a solid state laser photocoagulation device to destroy avascular portions of the periphery of the retinal layer.

6. The method of claim 4, further comprising inserting a probe to briefly touch and freeze spots on said retinal vasculature.

7. The method of claim 4, wherein said top portion and said bottom portion define a posterior chamber, and wherein said posterior chamber is filled with a vitreous gel, comprising:

removing said vitreous gel;

peeling back scar tissue on said retinal layer.

8. The method of claim 4, further comprising:

placing a silicone band around said model newborn human eye;

tightening said silicone band; and causing the sclera to buckle towards said retinal layer.

9. The method of claim 4, further comprising:

determining if retinal hemorrhaging can be observed;

when retinal hemorrhaging is observed, determining if said retinal hemorrhaging is bilateral;

when said retinal hemorrhaging is bilateral, determining if flame-shaped hemorrhages can be observed;

when flame-shaped hemorrhages can be observed, determining that child abuse should be highly suspect.

10. A method to practice Optical Coherence Tomography ("OCT") to obtain surface and subsurface images of the retina, comprising:

providing a model newborn human eye dimensioned to mimic an average newborn human eye and comprising a hemispherical-shaped, integrally molded top assembly comprising a visually transparent cornea portion surrounding a visually opaque sclera portion, a hemispherical-shaped bottom assembly comprising a bowl-shaped substrate disposed therein, and a retinal layer comprising a three dimensional retinal vasculature disposed on said substrate;

directing an optical beam at the retinal layer;

using interferometry record an optical path length of received photons;

collecting light directly reflected from retinal layer surfaces.

11. The method of claim 10, wherein said retinal layer is formed to include a subsurface fluid cavity formed therein, comprising imaging 1 to 2 mm below a surface of said retinal layer to image said subsurface fluid cavity.

* * * * *